A. W. KROONA.
CLOTHESLINE HOLDER.
APPLICATION FILED AUG. 27, 1921.

1,411,850.

Patented Apr. 4, 1922.

Inventor
A. W. Kroona,
By
Attorney

UNITED STATES PATENT OFFICE.

ANDREW W. KROONA, OF MINNEAPOLIS, MINNESOTA.

CLOTHESLINE HOLDER.

1,411,850.    Specification of Letters Patent.    Patented Apr. 4, 1922.

Application filed August 27, 1921. Serial No. 495,894.

*To all whom it may concern:*

Be it known that ANDREW W. KROONA, a citizen of the United States of America, residing at Minneapolis, in the county of Hennepin and State of Minnesota, has invented new and useful Improvements in Clothesline Holders, of which the following is a specification.

The object of the invention is to provide a simple and efficient as well as inexpensive means whereby the end of a clothes line may readily be fastened without resorting to the ties or knots ordinarily required in that connection to facilitate the fastening of the same under a tension suitable for the purpose with the minimum of effort on the part of the operator; and with this object in view the invention consists in a construction and combination of parts of which a preferred embodiment is shown in the accompanying drawings, wherein:—

Figure 1:
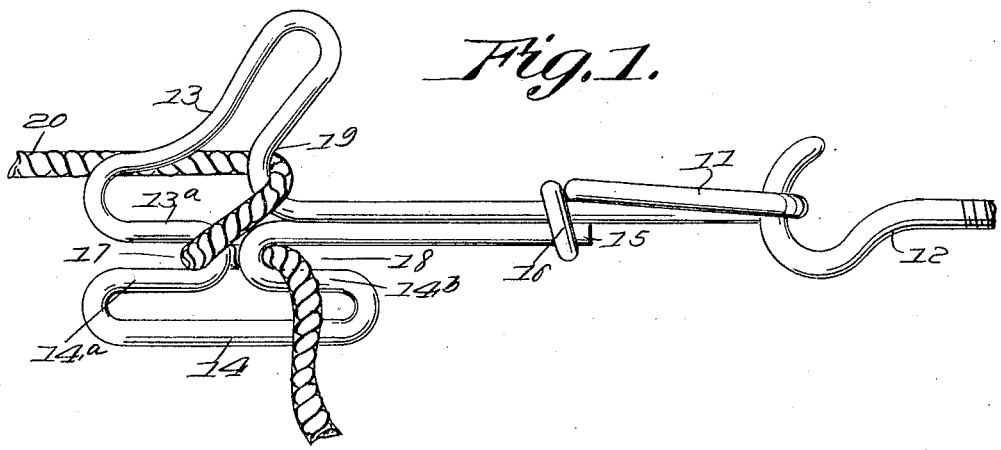
Figure 1 is a side view of a holder embodying the invention having the clothes line or rope engaged therewith in the operative position.
Figure 2:
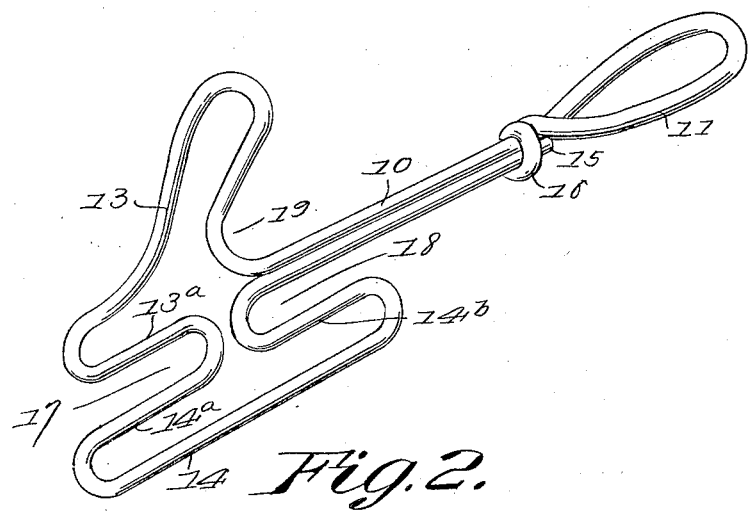
Figure 2 is a view of the holder detached.

The device is preferably constructed of a single blank or length of heavy wire or rod and consists essentially of a shank 10 having a terminal hitch eye 11 for engagement with a hook 12 or like anchoring device suitable for attachment to a post, fence, wall or the like, and oppositely directed elements carried by the shank and consisting essentially of a hook 13 and a T-head 14 respectively formed by looped portions of the strands or sides of the wire forming the shank. One terminal of the wire blank as indicated at 15 is secured by a coil 16 formed by the other terminal thereof after the last-named terminal has been looped to form the eye 11. The oppositely directed hook 13 and T-head 14 are formed by the intermediate portion of the blank with the inner sides 14ª and 14ᵇ of the T-head arranged in substantially parallel but close relation with the back 13ª of the hook 13 and the adjacent portion of the shank to constitute reduced throats or seats 17 and 18.

The hook 13 is provided with a relatively broad throat 19 with which the rope forming the clothes line and which is indicated at 20 may be primarily engaged so that the operator by holding the free end of the rope can draw the same around and through the hook to apply the desired tension thereto so that the line will be in a taut and proper condition to support the clothes. Having secured this required tension the free end of the rope is passed into the throat 17 and thence around the stem of the T-head 14 and through the throat 18 which effectually locks the rope and maintains the tension which has been applied thereto.

Thus in operation after having strained the rope to secure the desired tension it is only necessary to quickly pass the same around the line of connection between the hook and the T-head to force it into the throats 17 and 18 successively in order to fasten it, and as the major portion of the strain due to the tension of the operating portion of the line is applied to the hook which is formed as a part of that strand of the shank which is doubled upon itself to constitute the eye 17, it will be obvious that the strain of the line will be conveyed directly to the anchoring hook 12, and the possibility of distorting the holder is reduced to the minimum.

Having described the invention, what is claimed as new and useful is:—

1. A clothes line hitch or holder consisting of a shank provided at one end with an attaching eye and at the other end with oppositely directed hook and T-head members of which the inner side of the latter is disposed adjacent to the back of the hook to form rope engaging and compressing throats, said holder being constructed of a single blank of wire of which one terminal is looped to form said eye and is coiled about itself and the other terminal of the blank to provide a double strand shank.

2. A clothes line hitch or holder consisting of a shank provided at one end with an attaching eye and at the other end with oppositely directed hook and T-head members of which the inner side of the latter is disposed adjacent to the back of the hook to form rope engaging and compressing throats, the holder consisting of a single blank of wire of which the terminal portions are arranged in parallelism to constitute a two-strand shank and of which the intermediate portion is looped in opposite directions to provide said hook and T-head.

In testimony whereof he affixes his signature.

ANDREW W. KROONA.